United States Patent
Pan et al.

(10) Patent No.: US 11,598,751 B2
(45) Date of Patent: Mar. 7, 2023

(54) RESONANCE DETECTION SYSTEM FOR PERIPHERAL INTERFACE DEVICE

(71) Applicant: Primax Electronics Ltd., Taipei (TW)

(72) Inventors: Chin-Sung Pan, Taipei (TW);
Chien-Hung Liu, Taipei (TW);
Chia-Wei Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 41 days.

(21) Appl. No.: 17/411,834

(22) Filed: Aug. 25, 2021

(65) Prior Publication Data
US 2022/0404315 A1   Dec. 22, 2022

(30) Foreign Application Priority Data
Jun. 21, 2021 (TW) .................... 110122629

(51) Int. Cl.
*G01N 29/04*   (2006.01)
*G01N 29/14*   (2006.01)
(Continued)

(52) U.S. Cl.
CPC .......... *G01N 29/045* (2013.01); *G01N 29/12* (2013.01); *G01N 29/14* (2013.01); *G01H 13/00* (2013.01);
(Continued)

(58) Field of Classification Search
CPC . G01H 13/00; G01M 7/025; G01N 2291/014; G01N 2291/023;
(Continued)

(56) References Cited

U.S. PATENT DOCUMENTS

2007/0261493 A1* 11/2007 Kim .................... G01M 5/0033
73/594

FOREIGN PATENT DOCUMENTS

| CN | 103515525 A | * | 1/2014 | |
| CN | 107478722 A | * | 12/2017 | .......... G01N 29/045 |

(Continued)

*Primary Examiner* — David L Singer
(74) *Attorney, Agent, or Firm* — Kirton McConkie; Evan R. Witt (57) ABSTRACT

A resonance detection system includes a vibration simulation mechanism and a vibration audio analysis device. The vibration simulation mechanism includes a mechanism body that accommodates a peripheral interface device, such as a notebook computer key input mechanical structure. The vibration simulation mechanism generates a vibration wave to the peripheral interface device generates a vibration audio signal in response to the vibration wave. The vibration simulation mechanism further includes a patch-type audio collector, such as a miniature auscultation radio patch, which is connected with the vibration audio analysis device. The patch-type audio collector is attached on the mechanism body containing the peripheral interface device. The vibration audio signal is collected by the patch-type audio collector. The vibration audio analysis device judges whether there is an abnormal resonance phenomenon in the vibration auto signal, which may be used for fabrication quality control of peripheral interface devices.

20 Claims, 7 Drawing Sheets

(51) Int. Cl.
*G01N 29/12* (2006.01)
*G01M 7/02* (2006.01)
*G01H 13/00* (2006.01)

(52) U.S. Cl.
CPC ....... *G01M 7/025* (2013.01); *G01N 2291/014* (2013.01); *G01N 2291/023* (2013.01); *G01N 2291/2697* (2013.01)

(58) Field of Classification Search
CPC ......... G01N 2291/2697; G01N 29/045; G01N 29/12; G01N 29/14; G06F 11/2221
See application file for complete search history.

(56) References Cited

FOREIGN PATENT DOCUMENTS

| | | | |
|---|---|---|---|
| CN | 107741539 A | * | 2/2018 |
| CN | 113068100 A | * | 7/2021 |
| DE | 102018202995 A1 | * | 8/2019 |

* cited by examiner

RESONANCE DETECTION SYSTEM FOR PERIPHERAL INTERFACE DEVICE

FIELD OF THE INVENTION

The present invention relates to a resonance detection system, and more particularly to a resonance detection system for detecting whether a peripheral interface device has an abnormal resonance phenomenon.

BACKGROUND OF THE INVENTION

Nowadays, various kinds of consumer electronic information products or communication products on the market are becoming slimmer and slimmer. Moreover, these products have various audio and visual functions to meet people's consumption and entertainment needs.

However, in the production process of various slim-type electronic products, many mechanical components inside the electronic products usually generate a lot of unexplained noise signals because of the interlaced interference caused by the design configuration or the mutual operation. The noise signals may deteriorate the production quality. Especially, due to the vibration of active components, passive components generate the abnormal phenomenon of unknown resonance audio signals. Therefore, it is important to avoid the abnormal phenomenon.

For example, the trends of designing notebook computers are toward slimmer and slimmer. Consequently, the installation positions of the internal components in the notebook computer are gradually close to each other or contacted with each other. For example, a notebook computer is equipped with a peripheral interface device (e.g., a key mechanical structure) for the user to perform the key input operation. Moreover, the notebook computer usually has a built-in audio device for sound playback. The audio device is an active component with plural speaker units. During the operation of the audio device, these speaker units are driven to convert various normal audio signals (e.g., music) into a vibration wave in a vibrating manner. Consequently, the generated sound can be heard by human ears.

Due to the limitation of the internal space, the installation position of the audio device is usually close to the key mechanical structure. Moreover, the key mechanical structure is a passive component. Consequently, the vibration wave generated by the speaker units (e.g., a specified-frequency vibration wave generated by a certain piece of certain music) may directly influence various mechanical structures under the key mechanical structure (e.g., the scissors-type connecting structure under the key) in the vibrating manner. In case that the assembling process or the design quality of the electronic product is abnormal, the electronic product readily generates unexplained high-frequency resonance audio signals. This abnormal phenomenon is easily sensed by the human ears.

For overcoming the drawbacks of the conventional technologies, there is a need of providing a resonance detection system for quickly detecting the unexplained high-frequency resonance audio signals in the fabricating process of various slim-type electronic products and smoothly eliminating the unexplained high-frequency resonance audio signals.

SUMMARY OF THE INVENTION

An object of the present invention provides a resonance detection system for detecting whether a peripheral interface device has an abnormal resonance phenomenon in response to a vibration wave.

In accordance with an aspect of the present invention, a resonance detection system for detecting a peripheral interface device is provided. The resonance detection system includes a mechanism body, a vibration generator, a patch-type audio collector and a vibration audio analysis device. The peripheral interface device is accommodated within the mechanism body. The vibration generator is located near the mechanism body. The vibration generator generates a vibration wave and transmits the vibration wave to the peripheral interface device within the mechanism body. The patch-type audio collector is attached on the mechanism body. The patch-type audio collector collects a vibration audio signal that is generated by the peripheral interface device in response to the vibration wave. The vibration audio analysis device is electrically connected with the patch-type audio collector. After the vibration audio signal is inputted into the vibration audio analysis device, the vibration audio analysis device judges whether there is an abnormal resonance phenomenon in the vibration audio signal.

In an embodiment, the peripheral interface device at least includes a key mechanical structure.

In an embodiment, the mechanism body at least includes an upper cover and a base. The peripheral interface device is arranged between the upper cover and the base.

In an embodiment, the vibration generator is located near or attached on a bottom side of the base, and the patch-type audio collector is attached on a top side of the upper cover.

In an embodiment, the vibration generator simulates one of an audio device and an active radiator to generate the vibration wave.

In an embodiment, a frequency of the vibration wave is in a range between 20 Hz and 20 kHz.

In an embodiment, the patch-type audio collector is a miniature auscultation radio patch.

In an embodiment, the vibration audio analysis device includes a control and analysis unit. The vibration audio analysis device is electrically connected with the vibration generator and the patch-type audio collector. The vibration generator generates the vibration wave under control of the control and analysis unit. After the vibration audio signal is inputted into the control and analysis unit, the control and analysis unit judges whether there is the abnormal resonance phenomenon in the vibration audio signal.

In an embodiment, the resonance detection system further includes a detection carrier, and the mechanism body is installed on the detection carrier.

In an embodiment, the vibration simulation mechanism further includes plural anti-vibration units, and the plural anti-vibration units are arranged between the detection carrier and the mechanism body.

In accordance with another aspect of the present invention, a resonance detection system for detecting a peripheral interface device is provided. The resonance detection system includes a vibration simulation mechanism and a vibration audio analysis device. The vibration simulation mechanism includes a mechanism body that accommodates the peripheral interface device. The vibration simulation mechanism generates a vibration wave and transmits the vibration wave to the peripheral interface device. The peripheral interface device generates a vibration audio signal in response to the vibration wave. The vibration audio signal is collected and outputted by the vibration simulation mechanism. The vibration audio analysis device is electrically connected with the vibration simulation mechanism. After the vibration audio signal is inputted into the vibration audio analysis device, the vibration audio analysis device judges whether there is an abnormal resonance phenomenon in the vibration audio signal. The vibration simulation mechanism further includes a patch-type audio collector, which is electrically connected with the vibration audio analysis device. The patch-type audio collector is attached on the mechanism body containing the peripheral interface device. The vibration audio signal is collected by the patch-type audio collector.

In an embodiment, the peripheral interface device at least includes a key mechanical structure.

In an embodiment, the vibration simulation mechanism includes the mechanism body, a vibration generator and the patch-type audio collector. The peripheral interface device is accommodated within the mechanism body. The vibration generator is located near the mechanism body. The vibration generator generates the vibration wave and transmits the vibration wave to the peripheral interface device within the mechanism body. The patch-type audio collector is electrically connected with the vibration audio analysis device. The patch-type audio collector collects the vibration audio signal that is generated by the peripheral interface device in response to the vibration wave.

In an embodiment, the mechanism body at least includes an upper cover and a base. The peripheral interface device is arranged between the upper cover and the base.

In an embodiment, the vibration generator is located near or attached on a bottom side of the base, and the patch-type audio collector is attached on a top side of the upper cover.

In an embodiment, the vibration generator simulates one of an audio device and an active radiator to generate the vibration wave.

In an embodiment, the patch-type audio collector is a miniature auscultation radio patch.

In an embodiment, the vibration audio analysis device includes a control and analysis unit. The vibration audio analysis device is electrically connected with the vibration generator and the patch-type audio collector. The vibration generator generates the vibration wave under control of the control and analysis unit. After the vibration audio signal is inputted into the control and analysis unit, the control and analysis unit judges whether there is the abnormal resonance phenomenon in the vibration audio signal.

In an embodiment, the resonance detection system further includes a detection carrier, and the mechanism body is installed on the detection carrier.

In an embodiment, the vibration simulation mechanism further includes plural anti-vibration units, and the plural anti-vibration units are arranged between the detection carrier and the mechanism body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
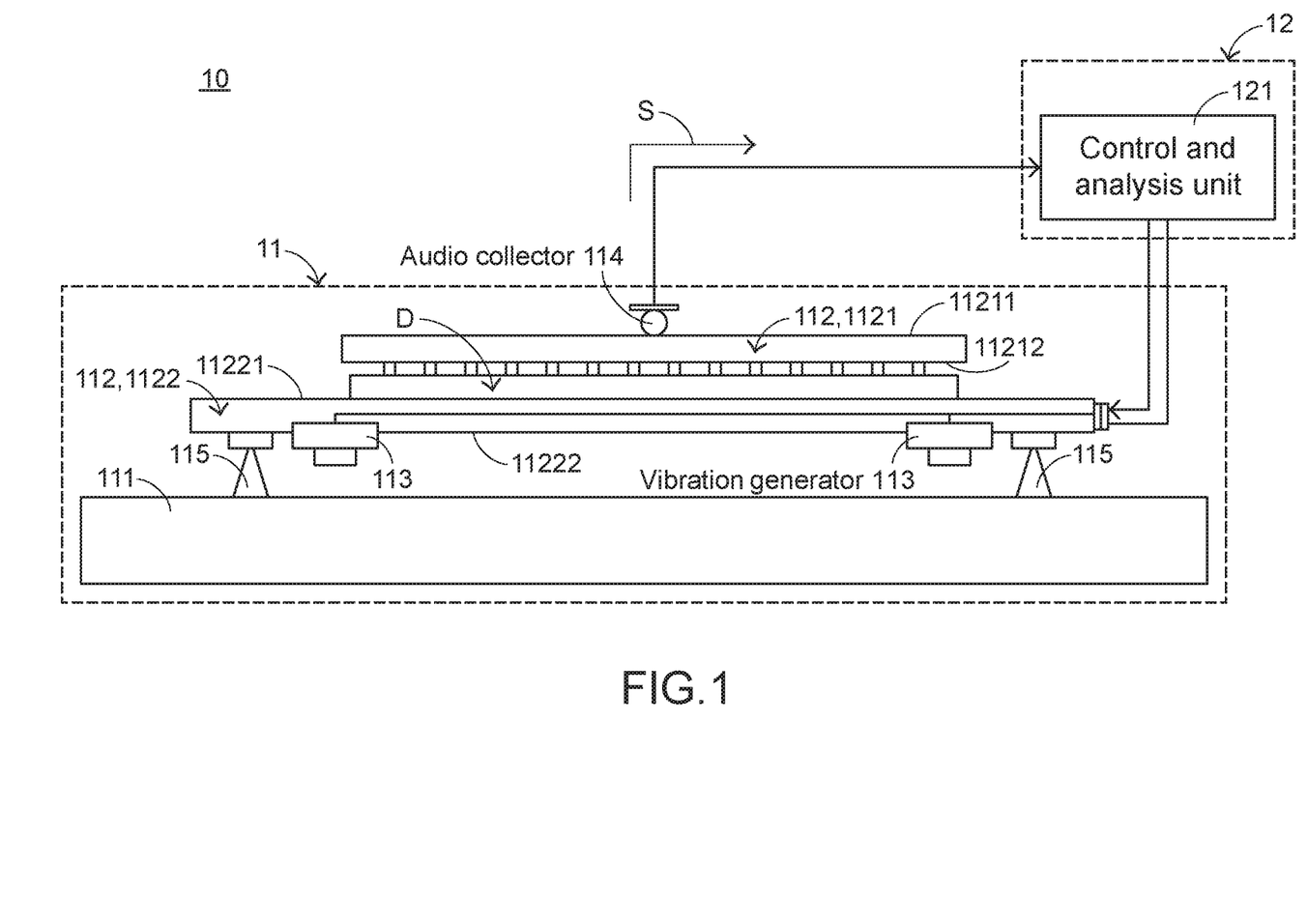
FIG. 1 schematically illustrates the concept of a resonance detection system according to an embodiment of the present invention.

FIG. 1 schematically illustrates the concept of a resonance detection system according to an embodiment of the present invention. The resonance detection system 10 as shown in FIG. 1 can be used to detect a peripheral interface device such as a key mechanical structure D. The resonance detection system 10 at least comprises a vibration simulation mechanism 11 and a vibration audio analysis device 12.

The vibration simulation mechanism 11 comprises a mechanism body 112 that can accommodate the key mechanical key structure D. Moreover, the vibration simulation mechanism 11 can generate a vibration wave and transmit the vibration wave to the key mechanical structure D. Consequently, the key mechanical structure D generates a vibration audio signal S in response to the vibration wave. The vibration audio signal S can be further collected and outputted by the vibration simulation mechanism 11.

The vibration audio analysis device 12 is electrically connected with the vibration simulation mechanism 11. After the vibration audio signal S is inputted into the vibration audio analysis device 12, the vibration audio analysis device 12 judges whether there is an abnormal resonance phenomenon in the vibration audio signal S.

The vibration simulation mechanism 11 further comprises at least one patch-type audio collector 114, which is electrically connected with the vibration audio analysis device 12. In addition, the patch-type audio collector 114 is attached on the mechanism body 112 containing the key mechanical key structure D. The patch-type audio collector 114 is used to collect the vibration audio signal S.

In an embodiment, the patch-type audio collector 114 is a miniature auscultation radio patch. The patch-type audio collector 114 is closely attached on the mechanism body 112 containing the key mechanical key structure D. Consequently, the patch-type audio collector 114 can completely collect the vibration audio signal S.

In case that the patch-type audio collector 114 is the miniature auscultation radio patch, the use of the patch-type audio collector 114 can advantageously reduce the overall volume and weight of the resonance detection system 10. Under this circumstance, it is not necessary to use the combination of a microphone and a heavy and large sealed speaker box (not shown) to collect the vibration audio signal S.

In the above embodiment, the resonance detection system 10 is used for detecting the key mechanical structure D. However, the applications of the resonance detection system 10 are not restricted. That is, the resonance detection system 10 can be applied to any other appropriate peripheral interface device.

In an embodiment, the vibration simulation mechanism 11 comprises the mechanism body 112, at least one vibration generator 113 and the at least one patch-type audio collector 114. The key mechanical key structure D is accommodated within the mechanism body 112. The vibration generator 113 is located near the mechanism body 112. The vibration generator 113 is used to generate the vibration wave and transmit the vibration wave to the mechanism body 112 containing the key mechanical structure D. The patch-type audio collector 114 is electrically connected with the vibration audio analysis device 12. The patch-type audio collector 114 is used to collect the vibration audio signal S that is generated by the key mechanical structure D in response to the vibration wave.

For example, the mechanical components in the key mechanical structure D (e.g., the scissors-type connecting structure under the key) generate the vibration audio signal S according to the vibration wave.

In an embodiment, the vibration audio analysis device 12 comprises a control and analysis unit 121. The control and analysis unit 121 is electrically connected with the vibration generator 113 and the patch-type audio collector 114. Under control of the control and analysis unit 121, the vibration generator 113 generates the vibration wave. After the vibration audio signal S is inputted into the control and analysis unit 121, the control and analysis unit 121 judges whether there is an abnormal resonance phenomenon in the vibration audio signal S.

In the above embodiment, the vibration generator 113 generates the vibration wave under control of the control and analysis unit 121. It is noted that numerous modifications and alterations may be made while retaining the teachings of the invention. For example, in another embodiment, the vibration generator 113 can generate the vibration wave autonomously.

In an embodiment, the vibration simulation mechanism 11 further comprises a detection carrier 111 and plural anti-vibration units 115. The mechanism body 112 is installed on the detection carrier 111. The plural anti-vibration units 115 are arranged between the detection carrier 111 and the mechanism body 112. The plural anti-vibration units 115 are used as buffering structures between the detection carrier 111 and the mechanism body 112.

In this embodiment, the detection carrier 111 is an open-type detection platform. It is noted that the example of the detection carrier 111 is not restricted. For example, in another embodiment, the detection carrier 111 is a close-type casing (not shown). Preferably but not exclusively, the plural anti-vibration units 115 are plural damping foot pads.

Figure 2A:
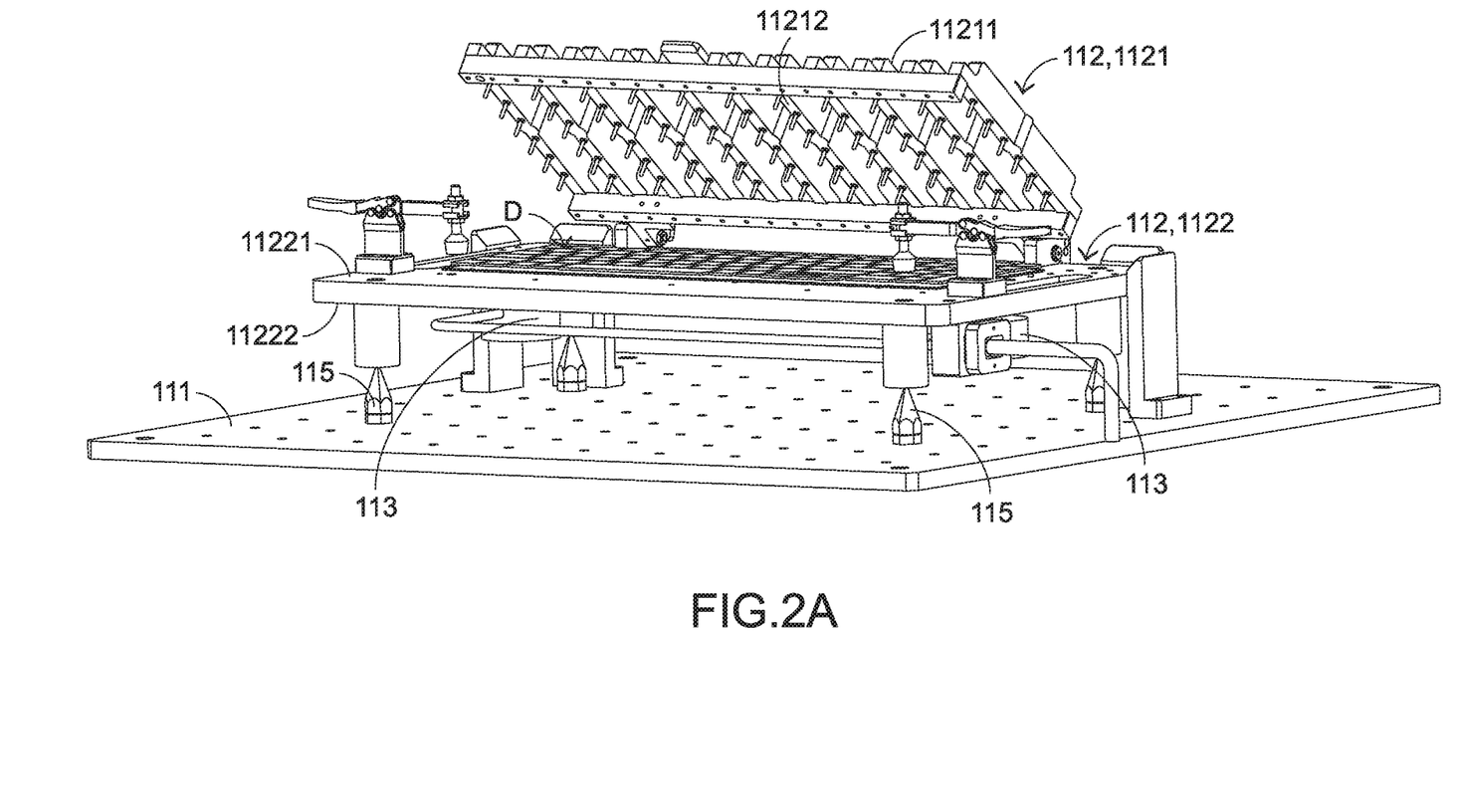
FIG. 2A is a schematic perspective view illustrating some components of the resonance detection system as shown in FIG. 1, in which the upper cover of the mechanism body is in an open state.
Figure 2B:
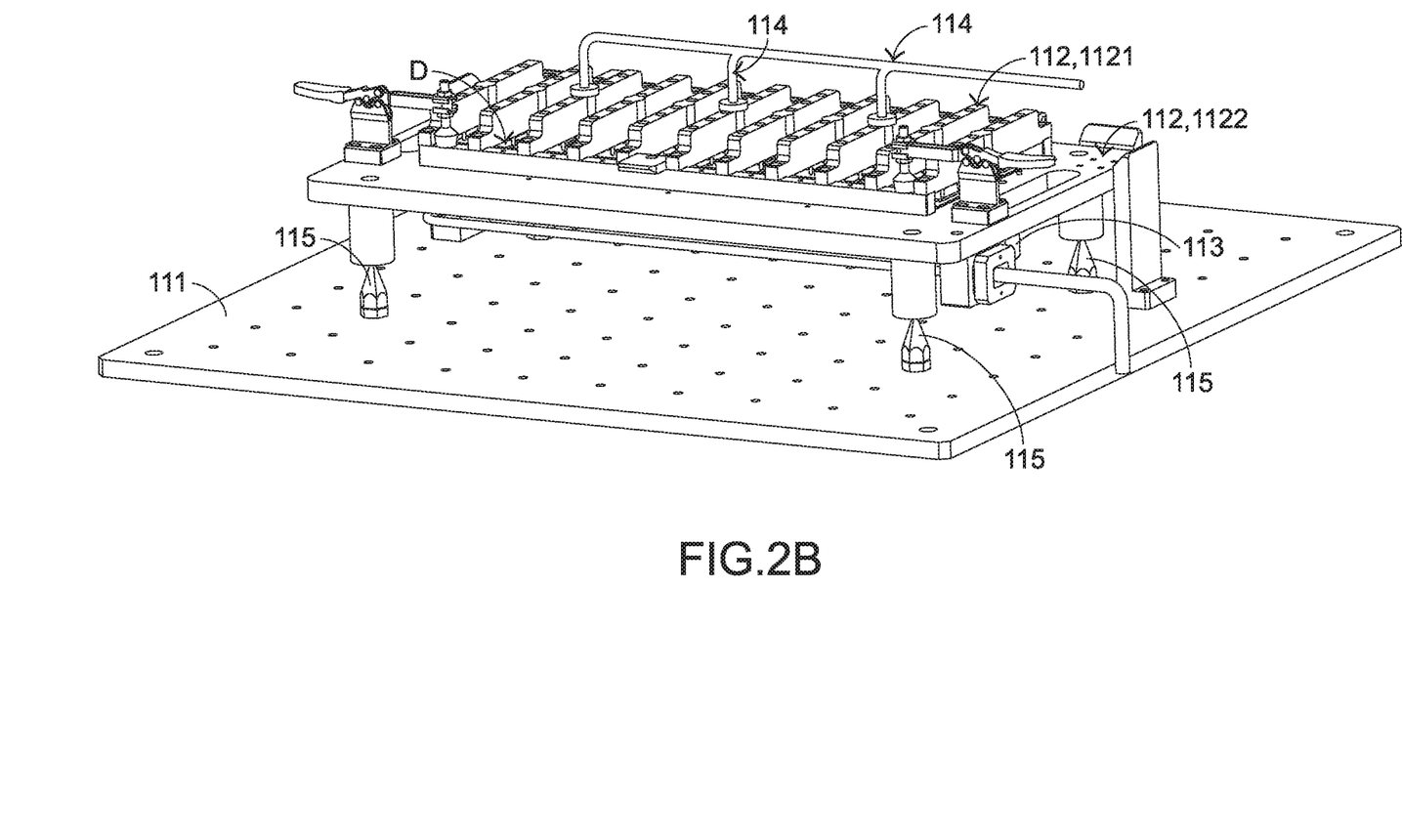
FIG. 2B is a schematic perspective view illustrating some components of the resonance detection system as shown in FIG. 1, in which the upper cover of the mechanism body is in a close state.

Please refer to FIGS. 2A and 2B. FIGS. 2A and 2B schematically illustrate some components in the resonance detection system of FIG. 1. For illustration, the vibration audio analysis device 12 is not shown in FIGS. 2A and 2B.

Figure 3A:
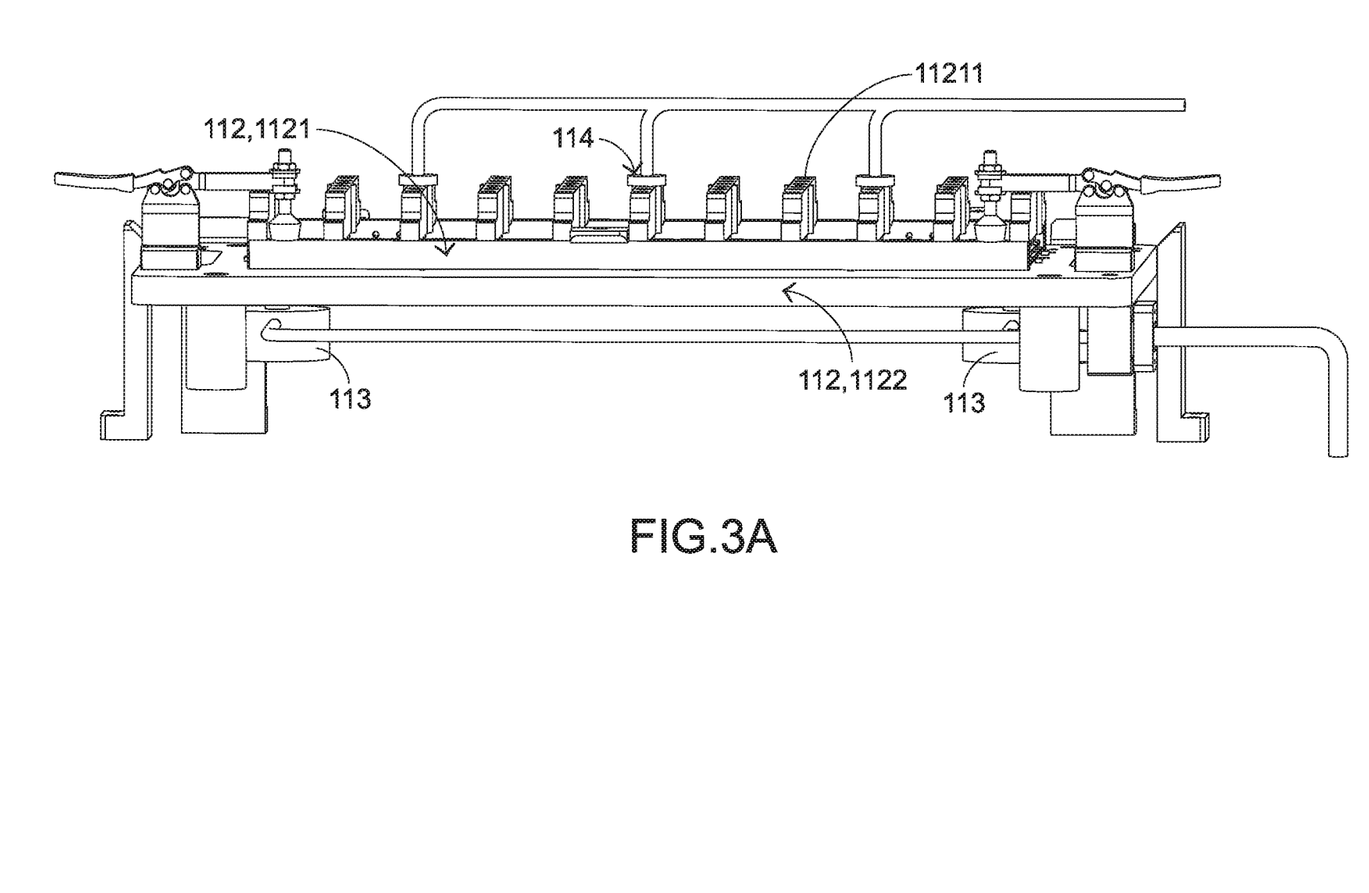
FIG. 3A is a schematic perspective view illustrating a portion of the structure as shown in FIG. 2B and taken along a viewpoint, in which the plural anti-vibration units and the detection carrier are not shown.
Figure 3B:
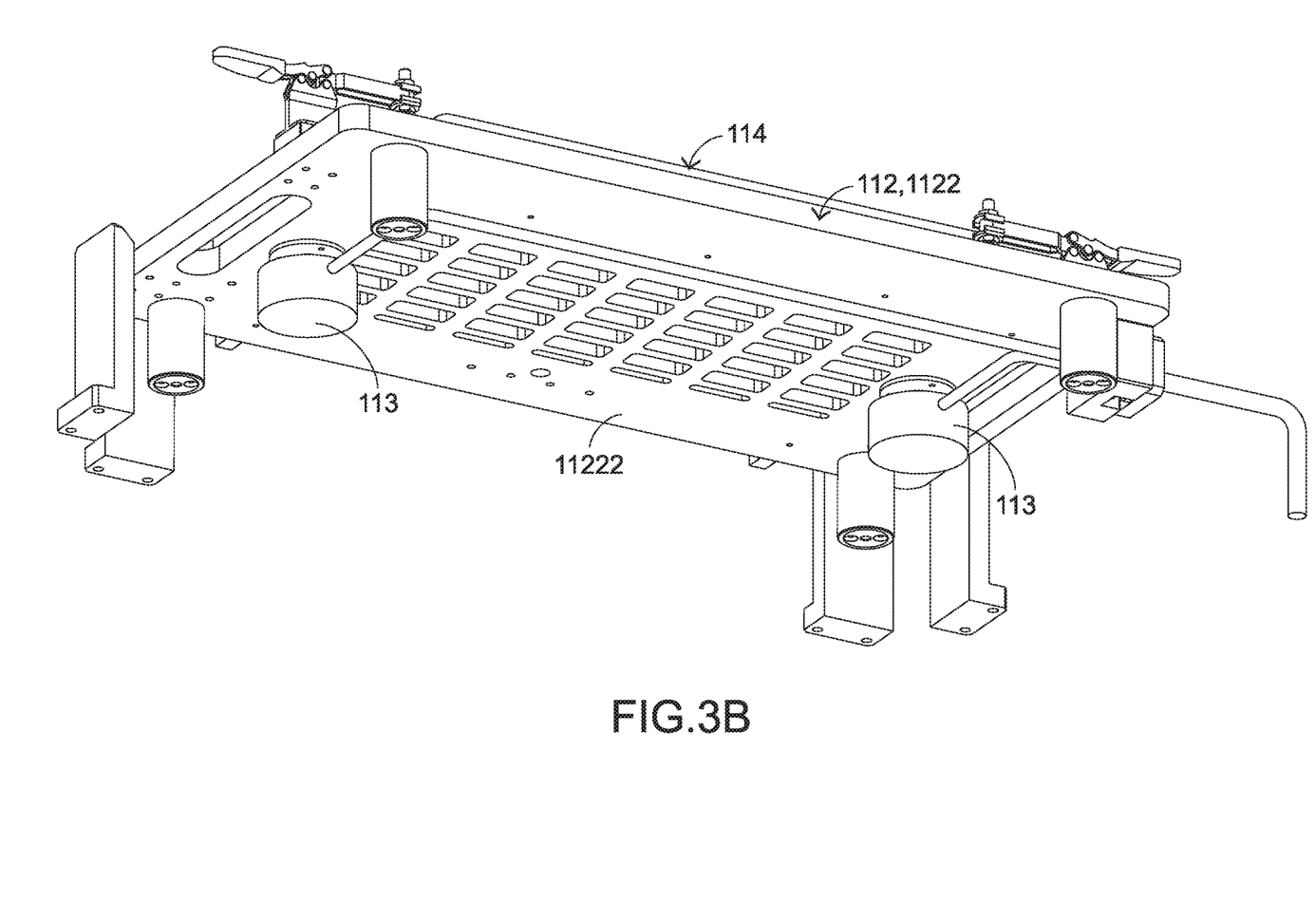
FIG. 3B is a schematic perspective view illustrating a portion of the structure as shown in FIG. 2B and taken along another viewpoint, in which the plural anti-vibration units and the detection carrier are not shown.
Figure 3C:
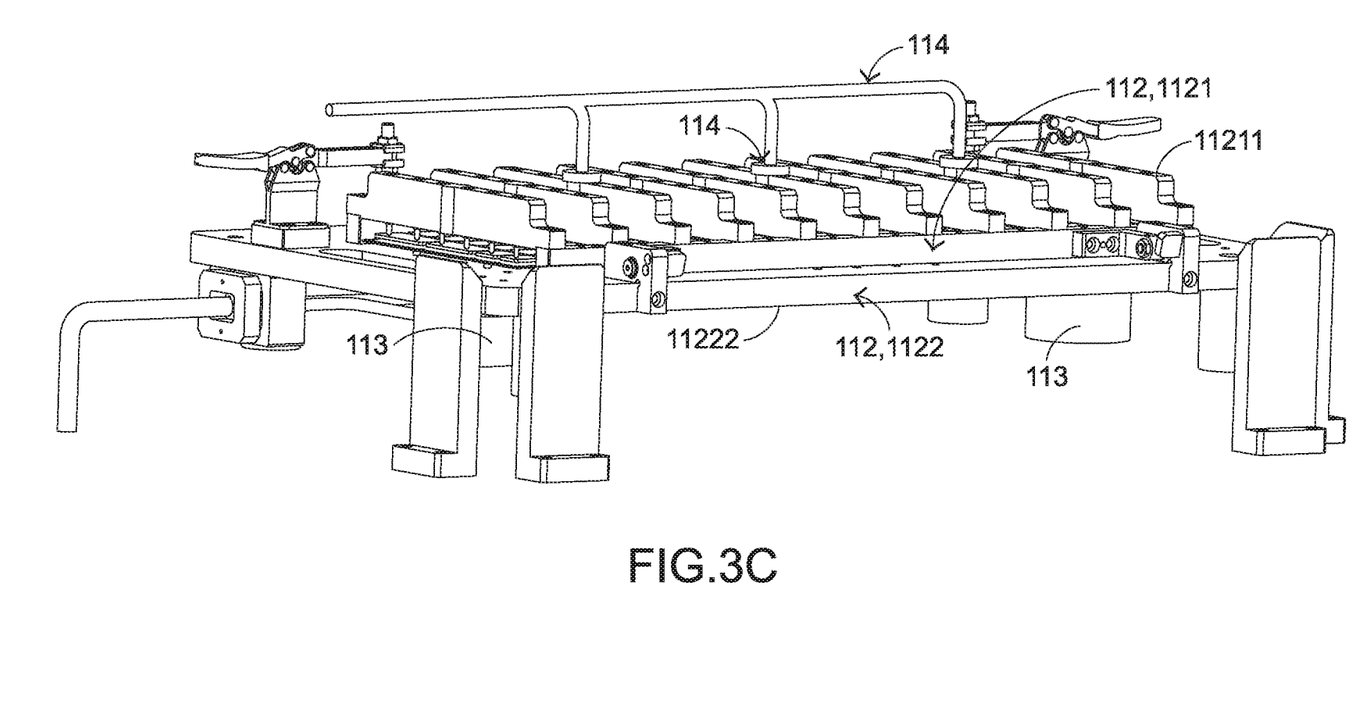
FIG. 3C is a schematic perspective view illustrating a portion of the structure as shown in FIG. 2B and taken along a further viewpoint, in which the plural anti-vibration units and the detection carrier are not shown.

In the perspective views of FIGS. 2A and 2B, an upper cover 1121 of the mechanism body 112 are in an open state and a closed state, respectively. FIGS. 3A, 3B and 3C are perspective views illustrating a portion of the structure as shown in FIG. 2B and taken along different viewpoints, in which the plural anti-vibration units 115 and the detection carrier 111 are not shown. It is noted that the examples of implementing the concepts of the resonance detection system as shown in FIG. 1 are not restricted to the embodiment of FIGS. 2A and 2B.

The mechanism body 112 in FIGS. 2A and 2B further comprises the upper cover 1121 and a base 1122. The key mechanical structure D is arranged between a bottom side 11212 of the upper cover 1121 and a top side 11221 of the base 1122. In this embodiment, the mechanism body 112 is a production fixture for simulating the appearance of a mechanism covering the key mechanical structure D. Moreover, the upper cover 1121 and the base 1122 are pivotally coupled to each other. When the upper cover 1121 is in the open state as shown in FIG. 2A, the key mechanical structure D can be placed into an accommodation space (not shown) of the mechanism body 112. When the upper cover 1121 is in the closed state as shown in FIG. 2B, a resonance detection procedure can be performed.

In this embodiment, the vibration generator 113 is located near or attached on the left/right sides of the bottom side 11222 of the base 1122 (see FIGS. 2A, 2B and 3B). The patch-type audio collector 114 is attached on the top side 11211 of the upper cover 1121 (see FIGS. 2A, 2B, 3A and 3C). In other words, the vibration generator 113 and the patch-type audio collector 114 are not in direct contact with the key mechanical structure D. Since the actual operations of the key mechanical structure D are not interfered or affected by the vibration generator 113 and the patch-type audio collector 114, this structural design can match the actual spatial arrangement of the internal components of the electronic product.

It is noted that the positions of the at least one vibration generator 113 and the at least one patch-type audio collector 114 relative to the base 1122 and the upper cover 1121 of the mechanism body 112 and the numbers of the at least one vibration generator 113 and the at least one patch-type audio collector 114 are not restricted. For example, in another embodiment, the vibration generator 113 and the patch-type audio collector 114 are adhered on the base 1122 or the upper cover 1121, or plural vibration generators 113 and plural patch-type audio collectors 114 are provided.

In this embodiment, the vibration generator 113 is used to simulate an audio device (not shown). The audio device is an active component comprising plural speaker units. The audio device drives the speaker units to convert various normal audio signals (e.g., music) into the vibration wave in a vibrating manner and generate the sound that can be heard by human ears. In this embodiment, the vibration generator 113 is used to simulate the speaker units to generate the vibration wave in the vibration manner. Preferably but not exclusively, the frequency of the vibration wave is in the range between 20 Hz and 20 kHz. Consequently, the vibration wave can be received by the human ears. It is noted that the frequency of the vibration wave is not restricted.

It is noted that the object to be simulated by the vibration generator 113 is not restricted to the audio device. For example, in another embodiment, the vibration generator 113 can be used to simulate an active radiator (not shown) to generates vibration.

In addition, after the vibration audio analysis device 12 collects the vibration audio signal S, the vibration audio analysis device 12 can further compare and analyze the vibration audio signal S according to various audio analysis technologies (e.g., AI audio analysis technologies).

Figure 4A:
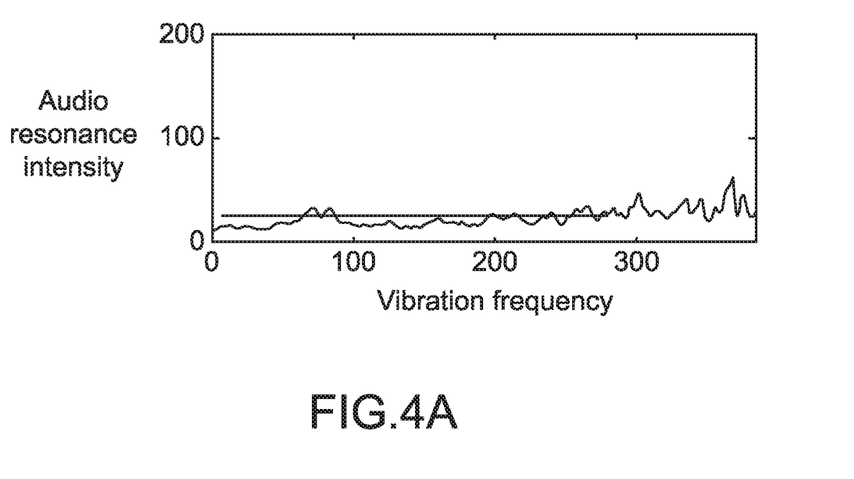
FIG. 4A is a plot illustrating the relationship between the intensity and the frequency of a vibration audio signal in a normal resonance phenomenon when the vibration audio signal is detected by the resonance detection system of FIG. 1.

FIG. 4A is a plot illustrating the relationship between the intensity and the frequency of a vibration audio signal in a normal resonance phenomenon when the vibration audio signal is detected by the resonance detection system of FIG. 1. As shown in FIG. 4A, the audio resonance effect is not obvious. In other words, when the key mechanical structure D is detected, the operations of the key mechanical structure D are not affected by the vibration wave, which is simulated by the vibration generator 113 in the general audio frequency range.

Figure 4B:
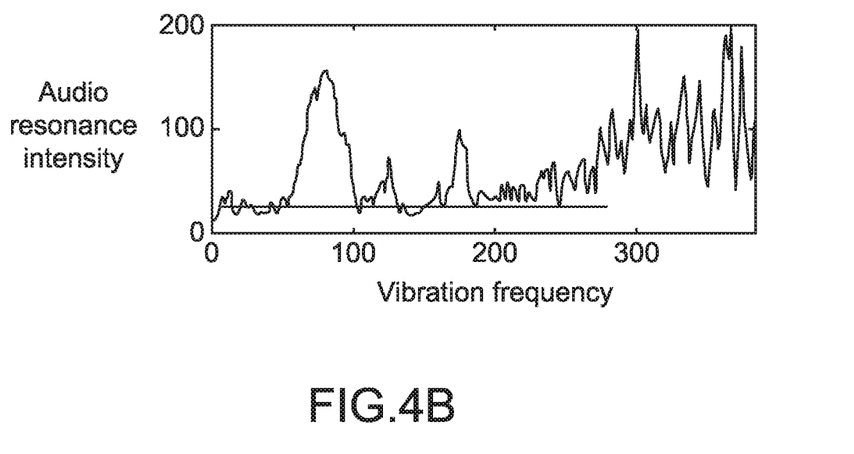
FIG. 4B is a plot illustrating the relationship between the intensity and the frequency of a vibration audio signal in an abnormal resonance phenomenon when the vibration audio signal is detected by the resonance detection system of FIG. 1.

FIG. 4B is a plot illustrating the relationship between the intensity and the frequency of a vibration audio signal in an abnormal resonance phenomenon when the vibration audio signal is detected by the resonance detection system of FIG. 1. As shown in FIG. 4B, the audio resonance effect is obvious. In other words, when the key mechanical structure D is detected, the operations of the key mechanical structure D are obviously affected by the vibration wave, which is simulated by the vibration generator 113 in the general audio frequency range. Moreover, the resonance detection system can realize in which frequency range the audio resonance phenomenon occurs. Consequently, the quality control department can further eliminate the mechanical component factors, the assembling factors or other possible potential causes that produce the audio resonance phenomenon. Alternatively, the unqualified products can be discarded directly.

From the above descriptions, the resonance detection system of present invention can effectively simulate and detect whether the peripheral interface device has an abnormal resonance phenomenon in response to various vibration waves. Consequently, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A resonance detection system for detecting a peripheral interface device, the resonance detection system comprising:
  a mechanism body, wherein the peripheral interface device is accommodated within the mechanism body;
  a vibration generator located near the mechanism body, wherein the vibration generator generates a vibration wave and transmits the vibration wave to the peripheral interface device within the mechanism body;
  a patch-type audio collector attached on the mechanism body, wherein the patch-type audio collector collects a vibration audio signal that is generated by the peripheral interface device in response to the vibration wave; and
  a vibration audio analysis device electrically connected with the patch-type audio collector, wherein after the vibration audio signal is inputted into the vibration audio analysis device, the vibration audio analysis device judges whether there is an abnormal resonance phenomenon in the vibration audio signal.

2. The resonance detection system according to claim 1, wherein the peripheral interface device at least comprises a key mechanical structure.

3. The resonance detection system according to claim 1, wherein the mechanism body at least comprises an upper cover and a base, wherein the peripheral interface device is arranged between the upper cover and the base.

4. The resonance detection system according to claim 3, wherein the vibration generator is located near or attached on a bottom side of the base, and the patch-type audio collector is attached on a top side of the upper cover.

5. The resonance detection system according to claim 1, wherein the vibration generator simulates one of an audio device and an active radiator to generate the vibration wave.

6. The resonance detection system according to claim 1, wherein a frequency of the vibration wave is in a range between 20 Hz and 20 kHz.

7. The resonance detection system according to claim 1, wherein the patch-type audio collector is a miniature auscultation radio patch.

8. The resonance detection system according to claim 1, wherein the vibration audio analysis device comprises a control and analysis unit, wherein the vibration audio analysis device is electrically connected with the vibration generator and the patch-type audio collector, and the vibration generator generates the vibration wave under control of the control and analysis unit, wherein after the vibration audio signal is inputted into the control and analysis unit, the control and analysis unit judges whether there is the abnormal resonance phenomenon in the vibration audio signal.

9. The resonance detection system according to claim 1, wherein the resonance detection system further comprises a detection carrier, and the mechanism body is installed on the detection carrier.

10. The resonance detection system according to claim 9, wherein the vibration simulation mechanism further comprises plural anti-vibration units, and the plural anti-vibration units are arranged between the detection carrier and the mechanism body.

11. A resonance detection system for detecting a peripheral interface device, the resonance detection system comprising:
  a vibration simulation mechanism comprising a mechanism body that accommodates the peripheral interface device, wherein the vibration simulation mechanism generates a vibration wave and transmits the vibration wave to the peripheral interface device, the peripheral interface device generates a vibration audio signal in response to the vibration wave, and the vibration audio signal is collected and outputted by the vibration simulation mechanism; and
  a vibration audio analysis device electrically connected with the vibration simulation mechanism, wherein after the vibration audio signal is inputted into the vibration audio analysis device, the vibration audio analysis device judges whether there is an abnormal resonance phenomenon in the vibration audio signal,
  wherein the vibration simulation mechanism further comprises a patch-type audio collector, which is electrically connected with the vibration audio analysis device, wherein the patch-type audio collector is attached on the mechanism body containing the peripheral interface device, and the vibration audio signal is collected by the patch-type audio collector.

12. The resonance detection system according to claim 11, wherein the peripheral interface device at least comprises a key mechanical structure.

13. The resonance detection system according to claim 11, wherein the vibration simulation mechanism comprises:

the mechanism body, wherein the peripheral interface device is accommodated within the mechanism body;
a vibration generator located near the mechanism body, wherein the vibration generator generates the vibration wave and transmits the vibration wave to the peripheral interface device within the mechanism body; and
the patch-type audio collector electrically connected with the vibration audio analysis device, wherein the patch-type audio collector collects the vibration audio signal that is generated by the peripheral interface device in response to the vibration wave.

14. The resonance detection system according to claim 13, wherein the mechanism body at least comprises an upper cover and a base, wherein the peripheral interface device is arranged between the upper cover and the base.

15. The resonance detection system according to claim 14, wherein the vibration generator is located near or attached on a bottom side of the base, and the patch-type audio collector is attached on a top side of the upper cover.

16. The resonance detection system according to claim 13, wherein the vibration generator simulates one of an audio device and an active radiator to generate the vibration wave.

17. The resonance detection system according to claim 13, wherein the patch-type audio collector is a miniature auscultation radio patch.

18. The resonance detection system according to claim 13, wherein the resonance detection system further comprises a detection carrier, and the mechanism body is installed on the detection carrier.

19. The resonance detection system according to claim 18, wherein the vibration simulation mechanism further comprises plural anti-vibration units, and the plural anti-vibration units are arranged between the detection carrier and the mechanism body.

20. The resonance detection system according to claim 11, wherein the vibration audio analysis device comprises a control and analysis unit, wherein the vibration audio analysis device is electrically connected with the vibration generator and the patch-type audio collector, and the vibration generator generates the vibration wave under control of the control and analysis unit, wherein after the vibration audio signal is inputted into the control and analysis unit, the control and analysis unit judges whether there is the abnormal resonance phenomenon in the vibration audio signal.

\* \* \* \* \*